No. 746,282.                                    Patented December 8, 1903.

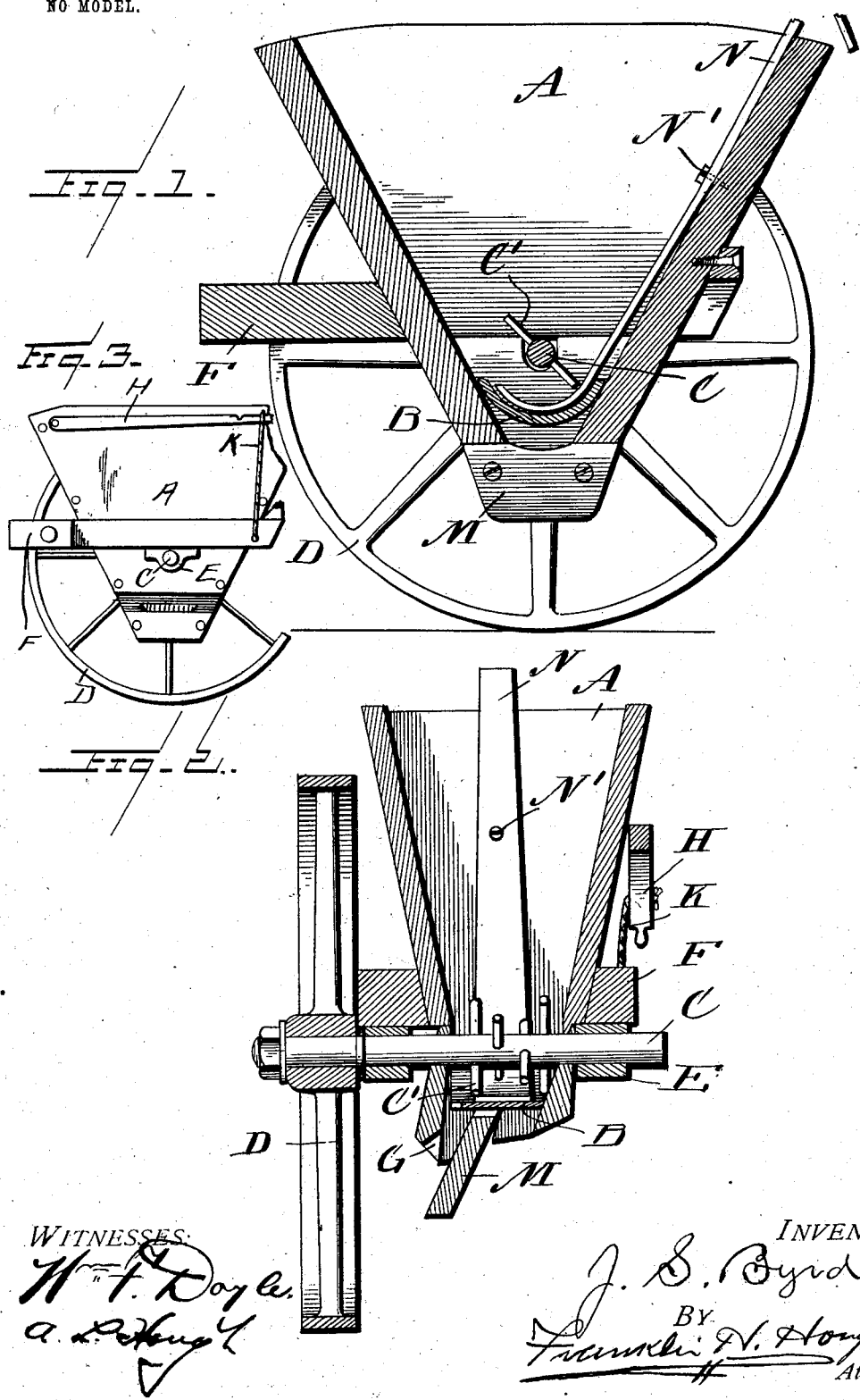

UNITED STATES PATENT OFFICE.

JESSE S. BYRD, OF LINDEN, NORTH CAROLINA.

GUANO-DISTRIBUTER.

SPECIFICATION forming part of Letters Patent No. 746,282, dated December 8, 1903.

Application filed August 18, 1903. Serial No. 169,909. (No model.)

*To all whom it may concern:*

Be it known that I, JESSE S. BYRD, a citizen of the United States, residing at Linden, in the county of Harnett and State of North Carolina, have invented certain new and useful Improvements in Guano-Distributers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in guano-distributers; and in carrying out the present invention it is my object to improve upon the form of construction of distributer upon which I have been granted Letters Patent in the United States, No. 702,921, dated June 24, 1902.

More specifically my invention comprises a guano-distributer having a box the bottom of which is concave and the provision of a shaft journaled in the opposite walls of the box, radiating stirrers projecting therefrom which turn in the concave portion of the box, and in the provision of a pivotal lever having a flattened end which is adapted to control the outlet to the box.

The invention consists, further, in the provision of a guano-distributer having a box with concave bottom controlled by a pivoted lever having a flattened end which is curved to conform to the concave bottom of the box and in the provision of an upper plate which is disposed at an angle adjacent to the exit end of the distributer-box, whereby as the guano falls through the exit it is directed adjacent to the wheel which rotates the stirrers.

The invention consists, further, in various details of construction, combinations, and arrangements of parts, which will be hereinafter fully described and then specifically defined in the appended claim.

My invention is illustrated in the accompanying drawings, in which—

Figure 1 is a vertical longitudinal sectional view through the machine, and Fig. 2 is a cross-sectional view. Fig. 3 is a detail view showing the lever for raising the bar.

Reference now being had to the details of the drawings by letter, A designates a box having tapering sides and provided with a concave bottom B, and C designates a shaft which is journaled in suitable bearings on opposite sides of the box and passes through the lower portion thereof to its curved concave bottom.

C' designates stirrers which radiate from the shaft and are adapted to turn inside the concave portion of the box to loosen the guano and cause the same to make exit freely through the feeding-aperture in the lower end of the box. The wheel D is mounted upon said shaft and is adapted to turn the shaft, and E designates a plow-beam, to which the frame F, supporting the box, is adapted to be held. Pivoted to one side of the box is a lever H, and K is a rope which is fastened to one end of the frame F and is caught over said lever and is provided for the purpose of raising the entire apparatus when it is desired to lift the same from the ground, in which case the weight of the forward end of the beam will be thrown upon the animal drawing the machine.

A lever N is pivotally mounted at N' inside of the box, and one end of said lever is bent to conform to the curved bottom of the box B and is flattened, as shown clearly in the sectional views of the drawings. One end of the lever N extends above the top of the box and forms a handle, whereby said lever may be rocked upon its pivot-pin for the purpose of throwing the curved ends of the lever over or away from the exit-aperture G in the bottom of the box.

M designates a deflecting-plate, which is fastened in a recessed portion of the bottom of box and positioned underneath the outlet end of the box, upon which plate the guano is adapted to fall through the box and to be directed adjacent to the lower end of the wheel D. Said plate may be either dovetailed or fastened in any suitable manner to the box.

From the foregoing it will be observed by the provision of a guano-distributer made in accordance with my invention the guano will be thoroughly agitated by the stirrers rotating in the concave portion of the box, and by swinging the lever N to one side or the other the inner curved ends of said lever may be thrown over the outlet-aperture or away therefrom, thus regulating the feeding of the guano, and by the provision of the deflecting-plate the guano may be thrown to the one side adjacent to the wheel.

While I have shown a particular construction of apparatus embodying the features of my invention, it will be understood that I may make alterations in the detailed construction of the same without departing from the spirit of the invention.

Having thus fully described my invention, what I claim as new, and desire to secure by Letters Patent, is—

A guano-distributer comprising a box, means for supporting the same upon the beam of a plow, an axle passing through the box and having stirrers thereon, means for rotating said axle, the bottom of the interior of the box being concaved, a lever within said box and pivoted to one of the inclined walls thereof, the lower end of said lever being concaved to conform to the bottom of the box, and a plate M fitted in a recess in the bottom of the box below the axle and fixed to the marginal edges of said recess and adapted to deflect the guano to one side of the box, as shown and described.

In testimony whereof I hereunto affix my signature in presence of two witnesses.

JESSE S. BYRD.

Witnesses:
B. F. SHAW,
R. E. BYRD.